(12) United States Patent
Zhong et al.

(10) Patent No.: US 6,629,878 B1
(45) Date of Patent: Oct. 7, 2003

(54) PRETREATMENT FOR REDUCING SURFACE TREATMENTS DEFECTS

(75) Inventors: Linda L. Zhong, Fremont, CA (US); Connie C. Liu, San Jose, CA (US); Roger Rostron Wills, Corona, CA (US); Jeff A. Railton, Placentia, CA (US); Shawn A. Mawla, San Jose, CA (US); Jeff D. St. John, Los Gatos, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/435,812

(22) Filed: Nov. 8, 1999

Related U.S. Application Data

(60) Provisional application No. 60/107,772, filed on Nov. 9, 1998.

(51) Int. Cl.[7] .................................................. B24B 7/00
(52) U.S. Cl. ........................................... 451/54; 451/28
(58) Field of Search .............................. 451/54, 53, 28; 427/127, 128, 129, 130, 131, 132, 438

(56) References Cited

U.S. PATENT DOCUMENTS

| | | | | |
|---|---|---|---|---|
| 3,202,529 A | * | 8/1965 | Dunlap, Jr. et al. | 427/129 |
| 4,659,605 A | * | 4/1987 | Malik et al. | 427/129 |
| 5,391,395 A | * | 2/1995 | Duchene | 427/129 |
| 5,405,646 A | * | 4/1995 | Nanis | 427/131 |

* cited by examiner

*Primary Examiner*—Robert A. Rose
(74) *Attorney, Agent, or Firm*—McDermott, Will & Emery

(57) ABSTRACT

Surface processing of metal, such as CMP, is enhanced and defects reduced by pretreatment to remove a surface layer exhibiting properties different from the bulk metal, such as a baked on oxide layer. Embodiments of the present invention include acid soaking a non-magnetic substrate having an Al, Ni or Ni—P surface with a baked oxide film thereon, thereby removing the oxide film and rendering the reduced surface amenable to CMP with reduced defects, reduced surface roughness and increased production throughput.

10 Claims, No Drawings

PRETREATMENT FOR REDUCING SURFACE TREATMENTS DEFECTS

RELATED APPLICATION

This application claims priority from Provisional Application Ser. No. 60/107,772 filed Nov. 9, 1998, entitled "A Pretreatment Method For Chemical-Mechanical Polish Of Metal Surfaces", the entire disclosure of which is hereby incorporated herein by reference.

TECHNICAL FIELD

The present invention relates generally to methods of surface treating a metal article, such as chemical-mechanical polishing (CMP) metal surfaces. The present invention has particular applicability in CMP non-magnetic substrates for use in manufacturing high areal density magnetic recording media exhibiting low noise and high coercivity.

BACKGROUND ART

Throughout various industries, metals are processed chemically and/or mechanically thereby altering the surface properties and rendering them less amenable to subsequent surface processing tailored for the chemical and/or physical properties of the bulk metal, such as grinding or CMP. Such alteration results in decreased yield, reduced production throughput and product inferiority.

Various metal platings, such as nickel (Ni) platings or deposits, enjoy technological applicability in various industries, such as the electronic, oil and gas, aerospace, machinery, automobile and magnetic recording media industries. For example, electroless Ni is employed in the metal finishing industry for various metal substrates, including steel, copper, aluminum and alloys thereof Conventional electrolessly deposited Ni—P platings exhibit desirable physical and chemical properties, such as hardness, lubricity, appearance, and corrosion resistance. An amorphous Ni—P plating is conventionally applied to a non-magnetic substrate, such as aluminum (Al) or an Al-alloy substrate in manufacturing magnetic recording media.

In operation, a magnetic disk is normally driven by the contact start-stop (CSS) method, wherein the head begins to slide against the surface of the disk as the disk begins to rotate and, upon reaching a predetermined high rotational speed, the head floats in air at a predetermined distance from the surface of the disk due to dynamic pressure effects caused by the air flow generated between the sliding surface of the head and the disk during reading and recording operations, the transducing head is maintained at a controlled distance from the recording surface, supported on a bearing of air as the disk rotates. Upon terminating operation of the disk drive, the rotational speed of the disk decreases and the head begins to slide against the surface of the disk again and eventually stops in contact with and pressing against the disk. Thus, each time the head and disk assembly is driven, the sliding surface of the head repeats the cyclic operation consisting of stopping, sliding against the surface of the disk, floating in air, sliding against the surface of the disk and stopping.

For optimum consistency and predictability, it is necessary to maintain each transducer head as close to its associated recording surface as possible, i.e., to minimize the flying height of the head. Accordingly, a smooth recording surface is preferred, as well as a smooth opposing surface of the associated transducer head. However, if the head surface and the recording surface are too smooth, the precision match of these surfaces gives rise to excessive stiction and friction during the start up and stopping phases, thereby causing wear to the head and recording surfaces, eventually leading to what is referred to as "head crash." Thus, there are competing goals of reduced head/disk friction and minimum transducer flying height.

Conventional practices for addressing these apparent competing objectives involve providing a non-magnetic substrate with a hard metal plating thereon, e.g.; Ni—P, polishing, as by CMP, to obtain a smooth surface and then roughening a dedicated landing zone to reduce the head/disk friction by techniques generally referred to as "texturing." Conventional texturing involves mechanical polishing or laser texturing the surface of a disk substrate to provide a texture thereon prior to subsequent deposition of layers, such as an underlayer, a magnetic layer, a protective overcoat, and a lubricant topcoat, wherein the textured surface on the substrate is intended to be substantially replicated in the subsequently deposited layers.

It is recognized, however, that electroless metal plating, such as electroless Ni—P plating of a non-magnetic substrate, even subsequent to smoothening, does not achieve a coating exhibiting a desired degree of surface smoothness, particularly the degree of smoothness necessary to satisfy the high areal recording density objectives of current magnetic recording media. For example, ridgeline defects cause media glide and certify test failure. Ridgeline defects are caused by deformation of the Ni—P layer prior to polishing. Subsequent to polishing, surface deformation is smoothened and may pass inspection. However, upon sputter depositing subsequent layers thereon, the pre-deformed area becomes a ridge upon stress relieving at elevated temperatures. Attempts to rebake and repolish have been unsuccessful.

Conventional techniques for treating various metal surfaces, such as Al, Ni and Ni—P, include CMP for smoothening. In conventional CMP techniques, a wafer carrier assembly is rotated in contact with a polishing pad in a CMP apparatus. The polishing pad is mounted on a rotating turntable or platen, or moving above a stationary polishing table, driven by an external driving force. The wafers are typically mounted on a carrier or polishing head which provides a controllable pressure urging the wafers against the rotating polishing pad. Thus, the CMP apparatus effects polishing or rubbing movement between the surface of each thin semiconductor wafer and the polishing pad while dispersing a polishing slurry, typically containing abrasive particles in a reactive solution typically comprising an oxidizer, to effect both chemical activity and mechanical activity while applying a force between the wafer and a polishing pad. In fixed abrasive articles, the abrasive particles are formed as columnar posts on a backing sheet and CMP is conducted using an abrasive-free chemical agent.

It is, however, extremely difficult to smoothen a hardened non-magnetic substrate without encountering severe surface defects, such as surface roughness, scratches and pitting. These surface defects are virtually impossible to recover without the expenditure of an inordinate, prohibitive amount of polishing time. Conventional smoothening methodology, therefore, cannot provide a non-magnetic substrate with a hardened surface having an average surface roughness (Ra) less than 4 Å to 5 Å.

There exists a need for methodology enabling surface treatment, such as CMP, of metal surfaces with reduced defects and enhanced production throughput. There exists a particular need for methodology enabling the manufacture of magnetic recording media comprising a non-magnetic substrate having a smoothened surface with an Ra less than 4 Å.

DISCLOSURE OF THE INVENTION

An advantage of the present invention is an efficient method for surface treating a metal with reduced surface defects.

Another advantage of the present invention is a method of manufacturing a magnetic recording media comprising CMP the surface of a hardened non-magnetic substrate with reduced surface defects and enhanced production throughput.

According to the present invention, the foregoing and other advantages achieved by a method of manufacturing a magnetic recording medium, the method comprising: treating a surface of a non-magnetic substrate having an oxide layer thereon to substantially remove the oxide layer; and chemical-mechanical polishing (CMP) the treated surface.

Embodiments of the present invention comprise electrolessly depositing a Ni or Ni—P layer on a non-magnetic substrate, baking in air to form a hardened oxide film having a thickness of about 80 Å or greater, soaking in an acid bath, e.g., a bath comprising sulfuric acid and phosphoric acid in deionized water, and subsequently conducting CMP to provide a smoothened surface with a Ra of about 2 Å to about 3 Å.

Another aspect of the present invention is a method of surface treating an article having a metal surface, the method comprising: processing the article such that a surface layer is formed on the surface exhibiting properties different from those of the underlying metal; chemically removing the surface layer and/or chemically modifying the surface such that the surface defects upon subsequent surface treatment are reduced; and surface treating the article.

Additional advantages of the present invention will become readily apparent to those skilled in this art from the following detailed description, wherein only the preferred embodiment of the present invention is shown and described, simply by way of illustration of the best mode contemplated for carrying out the present invention. As will be realized, the present invention is capable of other and different embodiments, and its details are capable of modifications in various obvious respects, all without departing from the present invention. Accordingly, the description is to be regarded as illustrative in nature, and not as restrictive.

DESCRIPTION OF THE INVENTION

The present invention addresses and solves problems attendant upon surface treating various metal surfaces having a surface layer exhibiting properties, e.g.; chemical and/or mechanical properties, different from those of the bulk of the metal. The present invention particularly solves problems attendant upon CMP a metal surface having a hardened oxide layer thereon with a thickness greater than about 20 Å, such as about 80 Å or greater, e.g., about 85 Å to about 120 Å. The present invention is most particularly applicable in providing a non-magnetic substrate having a hardened surface layer with reduced defects and a low surface roughness, e.g. about 2 Å to 3 Å.

Conventional practices comprise depositing an electroless Ni—P layer on a non-magnetic substrate, such as Al, an Al alloy, or an alternative substrate such as a glass, glass-ceramic, or ceramic material. The Ni—P layer is then heated at an elevated temperature, i.e., baked, for improved hardness and corrosion resistance. Subsequently, CMP is performed in an attempt to provide a smooth surface prior to texturing and sputter depositing layers thereon to form a magnetic recording medium. After extensive experimentation and investigation, it was found that baking the deposited Ni—P layer results in the formation of a relatively thick, hardened oxide layer, i.e., nickel oxide. Such baking is considered an important aspect of magnetic recording media manufacturing in that it provides a hardened surface for subsequent polishing and texturing as well as reducing the corrosion rate. However, it was found that the formation of such a hard relatively thick oxide film in excess of about 20 Å, e.g., about 85 Å to about 120 Å, adversely impacts the chemical-mechanical balance for CMP.

During conventional CMP, a passivating layer is formed on the substrate surface by chemical reaction, as by etching or oxidizing agents in the slurry. The protruding regions of the passivated surface is then abraded by mechanical action and the abraded portions dissolved and carried away by the flowing slurry. The recessed regions are protected by the passivated layers during polishing and, hence, the removal rate at the recessed regions is low vis-à-vis the removal rate at the protruding portions thereby resulting in a relatively smooth surface.

It was found, however, that the formation of a relatively thick hardened oxide film caused by baking to achieve a hard, corrosion resistance surface, is incompatible with the chemical-mechanical mechanisms of CMP, in that the hard thickened oxide layer is much more difficult to remove than the thin passivating layer formed by chemical action. Accordingly, the CMP mechanisms are altered and the process becomes primarily one of abrasion during which relatively large jagged oxide pieces are gouged out of the baked oxide layer, causing surface defects. In addition, the torn oxide particles are difficult to dissolve and remove, leading to even more scratching. Deep scratches formed during this process are difficult to remove without the expenditure of excessive polish steps/cycle time.

Having discovered what is believed to be the source of the problem of surface defects attendant upon CMP hardened non-magnetic substrate, further experimentation was conducted. As a result, it was found that the surface oxide can be substantially removed, as by chemical treatment, e.g., with an acid, thereby providing a surface compatible with the passivation/abrasion mechanisms of conventional CMP. The inventive pretreatment technique effects removal or modification of the hard oxide layer without localized corrosion, e.g., pitting. Consequently, the resulting surface after CMP exhibits substantially reduced defects and an Ra of about 2 to about 3 Å, with an attendant increase in production throughput and yield. The inventive pretreatment also enabled recovery of ridgeline parts by re-baking, deoxidation and repolishing by CMP. Such ridgeline defects could not be remedied in accordance with conventional practices as they appeared after polishing during inspection and, hence, resulted in rejection. The present invention enables a significant reduction in ridgeline rejections by performing re-baking, deoxidation and repolishing.

Embodiments of the present invention, therefore, comprise electrolessly depositing a metallic layer on a non-magnetic substrate, such as Ni or Ni—P, and baking in air as at a temperature of about 240° C. to about 260° C., for about 30 minutes to about 60 minutes, e.g., about 245° C. for about 45 minutes, to form a thick hardened oxide coating greater than about 80 Å, e.g., about 80 Å to about 125 Å. The baked on oxide coating is then substantially removed, as by treatment with an acid, e.g., by acid soaking. Subsequently, CMP is performed to obtain a smooth surface.

The present invention is also applicable in situations wherein manufacturing processes performed on metal treatments alters the properties of the surface of the metal vis-à-vis the bulk of the metal prior to surface treatment, such as grinding or CMP. Such manufacturing process may involve treatment in an environment or with chemicals that chemically alter the surface of the metal vis-à-vis the bulk of the metal, or mechanical treatment, such as cold working, that alter the mechanical properties of the surface vis-à-vis the bulk of the metal. However, the subsequent surface treatments are designed or optimized for the bulk of the metal and, hence, the altered surface presents a less than optimum situation resulting in delayed production throughput, decreased yield and inferior products. The present invention addresses and solves such problems by removing the altered surface layer before subsequent surface treatment, or by modifying or replacing an altered surface layer, as by forming a thin passivation layer amenable to subsequent surface processing, e.g., CMP.

In practicing embodiments of the present invention, an appropriate acid and concentration can be selected in a particular situation depending upon factors, such as the nature of the particular oxide. Suitable acids include sulfuric acid and phosphoric acid. For example, in removing a hardened nickel oxide coating on a Ni—P surface of a non-magnetic substrate, was found suitable to soak in an acid bath containing a solution of sulfuric acid, phosphoric acid and deionized water, for about 1 minute to about 7 minutes, e.g., about 3 minutes to about 5 minutes, at a temperature of about 140° C. to about 180° C., e.g., about 160° C. It was found particularly suitable to remove a nickel oxide coating using a solution comprising up to 40% sulfuric acid, up to 55% phosphoric acid, the remainder deionized water. For example, a commercial solution E-10, available from Enthone-OMI, Inc. of Pleasanton, Calif., was found particularly suitable when diluted to 10% by volume-using deionized water. It should be recognized that not all acids will be effective with all oxide layers. For example, nitric acid was not found particularly suitable in removing a baked on nickel oxide layer on Ni—P in that pitting was encountered.

Embodiments of the present invention comprise removing the surface layer, e.g., the hardened oxide layer, by acid soaking followed by water rinsing and surface treatment, e.g., performing CMP, while the substrate is wet. Other embodiments of the present invention include acid soaking, water scrubbing the surface, drying and then surface treating, e.g., performing CMP.

The exact mechanism operative in achieving a smooth, substantially defect free, surface in accordance with the present invention by etching a surface layer, such as a hardened oxide layer, prior to surface treatment, such as CMP, is not known with certainty. However, in the case of baked Ni—P coatings, it is believed that the oxidation technique of the present invention substantially removes the dense hard oxidation layer formed during baking. The oxidation layer is either removed permanently, or a new and more active surface layer, i.e., passivation layer, forms after etching before and/or during cleaning. This passivation layer is different in structure and chemistry from the hard baked on oxide layer and is easily removed during CMP without scratching. Basically, the removal of the hardened oxide layer renders the surface more amenable to the passivation-abrasion mechanism of conventional CMP.

Accordingly, it is believed that high temperature oxidation during baking proceeds in accordance with formula (1) below:

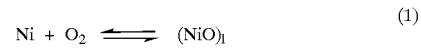

$$Ni + O_2 \rightleftharpoons (NiO)_I \quad (1)$$

The high temperature oxide noted as $(NiO)_I$ is dense, hard and difficult to dissolve under conventional CMP polishing conditions. Moreover, the hard debris generated during polishing causes further scratching.

In accordance with the present invention, acid etching is conducted to dissolve the high temperature oxide $(NiO)_I$ in accordance with formula (2) below:

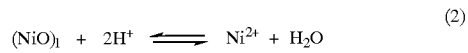

$$(NiO)_I + 2H^+ \rightleftharpoons Ni^{2+} + H_2O \quad (2)$$

The solution process of formula (2) above occurs in a highly acidic environment. Therefore, a new surface film similar to the passivation film formed during CMP can also form before and/or during cleaning in accordance with the formula (3) below:

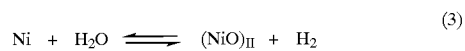

$$Ni + H_2O \rightleftharpoons (NiO)_{II} + H_2 \quad (3)$$

The new surface film $(NiO)_{II}$ forms at a lower temperature and in an aqueous environment. Accordingly, the new surface film $(NiO)_{II}$ is totally different from the high temperature film $(NiO)_I$ both in structure and chemistry. New surface film $(NiO)_{II}$ can be easily removed during CMP. Acid etching to remove the hardened thick oxide layer is believed to shift the corrosion potential from the domain of passivation to the domain of corrosion, thereby facilitating effective CMP. Accordingly, the deoxidation or acid etching technique in accordance with the present invention eliminates the high temperature oxide layer on the non-magnetic substrate surface, thereby enabling a significant reduction in polishing defects, to obtain a smoothened surface having an Ra of about 2 to 3 Å with improved yield. Testing revealed a 12% to 18% increase in yield attributed to the inventive oxide removal pretreatment technique vis-à-vis without the inventive pretreatment technique.

Surfaces suitable for planarization in accordance with the present invention include any of various metallic articles or metallic surfaces, such as electroless nickel platings deposited employing a conventional electroless nickel plating compositions. Electroless Ni plating compositions generally comprise four ingredients dissolved in a solvent, typically water. These ingredients are dissolved in a solvent, typically water. These ingredients include: (1) a source of Ni ions; (2) a reducing agent, such as a hypophosphite or an amine borane; (3) an acid or hydroxide pH adjuster to provide a suitable pH; and (4) a complexing agent for metal ions sufficient to prevent their precipitation in solution. Such suitable complexing agents are well known in the art. Accordingly, upon employing a hypophosphite as the reducing agent, the deposit will contain Ni and P. On the other hand, if an amine borane is employed, the deposit will contain Ni and boron.

Magnetic recording media in accordance with the present invention can comprise any conventional substrate, such as Ni—P/Al or an Ni—P/Al alloy substrate, Al or an Al alloy substrate, or a glass, ceramic, glass-ceramic or polymeric substrate. The present invention can be implemented employing any of the various seedlayers, underlayers, magnetic layers and lubricant topcoats conventionally employed in manufacturing magnetic recording media. For example, embodiments of the present invention comprise the use of a Cr or Cr alloy underlayer or underlayers, Co-alloy magnetic layers and PFPE lubricants for enhance durability.

The inventive technique is not confined to the alleviation of problems stemming from the baked on nickel oxide layer formed on non-magnetic substrates when manufacturing magnetic recording media. The present invention facilitates various surface treatments, such as grinding as well as CMP, of various substrates wherein a surface layer has been formed by processing such that the surface layer exhibits properties that differ from those of the bulk material, e.g., chemically or mechanical properties. Such surface layers include those that have undergone a chemical change, as by chemical reaction, and/or a change in mechanical properties, as during cold working, e.g., a stress layer. Most surface treatments, such as grinding and CMP, are designed or tailored with respect to the properties of the bulk material not the surface layer. In accordance with the present invention, the surface layer having different properties from the bulk material is removed and/or modified to facilitate the surface treatment.

The present invention enables efficient surface treatment, e.g., smoothening, of various metallic articles and metallic surfaces, such as Al, Ni, and Ni—P, by pretreating the surface to remove a surface layer having properties different from the underlying metal and/or modifying the surface, e.g., removing a baked hard oxide layer with subsequent formation of a passivation layer amenable to conventional surface treatments, such as CMP. The present invention enjoys industrial applicability in manufacturing any of various types of metallic articles or articles with metallic surfaces, particular magnetic recording media, including thin film disks. The present invention is particularly applicable in producing high areal recording density magnetic recording media requiring a low flying height.

In the previous description, numerous specific details are set forth, such as specific materials and processes, to provide a better understanding of the present invention. However, the present invention can be practiced without resorting to the details specifically set forth. In other instances, well known materials and techniques have not been described in detail in order not to unnecessarily obscure the present invention.

Only certain embodiments of the present invention and but a few examples of its versatility are shown and described in the present disclosure. It is to be understood that the present invention is capable of use in various other combinations and environments and is capable of changes and modifications within the scope of the inventive concept as expressed herein.

What is claimed is:

1. A method of manufacturing a magnetic recording medium, the method comprising sequentially:

chemically treating a surface of a non-magnetic substrate having a metal surface with a nickel oxide-containing layer thereon by soaking in an acid bath to substantially remove the nickel oxide-containing layer;

water rinsing after acid soaking;

chemical-mechanical polishing after water rinsing while the substrate surface is wet, or;

water scrubbing the substrate surface after acid soaking;

drying;

chemical-mechanical polishing; and subsequently depositing a magnetic layer.

2. A method of surface treating an article with a metal surface, the method comprising:

heating the article in the presence of oxygen to form a baked oxide layer; and substantially removing the baked oxide layer with an acid such that surface defects upon subsequent surface treatment are reduced.

3. A method of manufacturing a magnetic recording medium, the method, comprising:

heating a non-magnetic substrate in the presence of oxygen to form a based oxide layer on a surface thereof;

substantially removing the baked oxide layer with an acid and forming an oxide layer amenable to chemical-mechanical polishing in place of the baked oxide layer;

chemical-mechanical polishing the surface; and subsequently depositing a magnetic layer.

4. The method according to claim 3, comprising heating the non-magnetic substrate in air at 240° C. to about 260° C. for about 30 minutes to about 60 minutes.

5. The method according to claim 3, wherein the surface comprises aluminum, nickel, or nickel-phosphorous having the baked oxide layer thereon.

6. The method according to claim 5, wherein the baked oxide layer has a thickness greater than about 20 Å.

7. The method according to claim 5, comprising heating to form the baked oxide layer at a thickness of about 85 Å to about 120 Å.

8. A method of manufacturing a magnetic recording medium, the method comprising:

chemically treating a surface of a non-magnetic substrate having a metal surface with an oxide layer thereon with sulfuric acid or phosphoric acid to substantially remove the oxide layer;

chemical-mechanical polishing the chemically treated surface; and subsequently depositing a magnetic layer.

9. The method according to claim 8, comprising treating the substrate with a solution of sulfuric acid and phosphoric acid in deionized water.

10. The method according to claim 9, comprising soaking the substrate in a bath comprising a solution of sulfuric acid and phosphoric acid in deionized water.

* * * * *